US012812307B2

(12) United States Patent
Gomez

(10) Patent No.: US 12,812,307 B2
(45) Date of Patent: Nov. 24, 2026

(54) METHOD FOR OPERATING A HEARING DEVICE, AND HEARING DEVICE

(71) Applicant: Sivantos Pte. Ltd., Singapore (SG)

(72) Inventor: Gabriel Gomez, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 226 days.

(21) Appl. No.: 18/740,762

(22) Filed: Jun. 12, 2024

(65) Prior Publication Data

US 2024/0414485 A1 Dec. 12, 2024

(30) Foreign Application Priority Data

Jun. 12, 2023 (DE) ..................... 10 2023 205 436.1

(51) Int. Cl.
*H04R 25/00* (2006.01)
*H04R 25/02* (2006.01)

(52) U.S. Cl.
CPC ............ *H04R 25/50* (2013.01); *H04R 25/70* (2013.01); *H04R 25/02* (2013.01)

(58) Field of Classification Search
None
See application file for complete search history.

(56) References Cited

U.S. PATENT DOCUMENTS 8,411,885 B2 4/2013 Kornagel et al.
8,437,482 B2 * 5/2013 Seefeldt ................ H03G 5/005 381/104
10,674,283 B2 6/2020 Rosenkranz et al.
2007/0237347 A1 10/2007 Pfeiler
2010/0067721 A1 * 3/2010 Tiefenau .............. H04R 25/453 381/313
2014/0081114 A1 * 3/2014 Shachar ................. A61B 5/367 600/378

FOREIGN PATENT DOCUMENTS

EP 1843632 A2 10/2007
EP 2244491 A1 * 10/2010 ........... H04R 25/453
EP 3373599 A1 9/2018
KR 1020130129063 A 11/2013

* cited by examiner

*Primary Examiner* — Quynh H Nguyen
(74) *Attorney, Agent, or Firm* — Laurence A. Greenberg; Werner H. Stemer; Ralph E. Locher

(57) ABSTRACT

A method for operating a hearing device that include a microphone and a receiver that are signal-connected by way of a signal processing unit. A signal component that includes a specific frequency is selected from an input signal. A further signal at a further specific frequency is provided, and an output signal is created on a basis of the signal component and the further signal. The output signal is output by the receiver to create a sound. The further signal is configured such that first time intervals and second time intervals arise, with hair cells associated with a specific frequency assigned region of a basilar membrane of a user being excited on account of an interference during the first time intervals and there being no excitation of the hair cells during the second time intervals. There is also described a corresponding hearing device.

9 Claims, 3 Drawing Sheets

METHOD FOR OPERATING A HEARING DEVICE, AND HEARING DEVICE

CROSS-REFERENCE TO RELATED APPLICATION

This application claims the priority, under 35 U.S.C. § 119, of German Patent Application DE 10 2023 205 436.1, filed Jun. 12, 2023; the prior application is herewith incorporated by reference in its entirety.

FIELD AND BACKGROUND OF THE INVENTION

The invention relates to a method for operating a hearing device and to a hearing device. The hearing device comprises a microphone and a receiver that are signal connected by way of a signal processing unit.

Persons suffering from a reduced sense of hearing usually use a hearing aid, which is a hearing device. In this context, a microphone, i.e., an electromechanical acoustic transducer, is usually used to convert ambient sound into an electrical (audio/sound) signal such that an input signal is provided. The input signal is processed by means of an amplifier circuit and introduced into the auditory canal of the person by means of a further electromechanical transducer in the form of a receiver. Usually, the captured input signal is moreover processed depending on the reduction in the sense of hearing, wherefore use is usually made of a signal processing unit which may comprise the amplifier circuit.

To this end, the frequencies of the unmodified input signal that the user is only capable of perceiving in reduced fashion are usually initially determined at an audiologist. Then, during normal use of the hearing device, the signal processing unit is used to increase the respective amplitude at these frequencies, with the result that these components of the input signal are amplified. However, it is also possible that a user is completely incapable of perceiving specific frequencies, usually comparatively high frequencies, anymore. In this case, the signal processing unit is used to shift the corresponding components of the input signal to lower frequencies, which is also referred to as compression.

All of these methods only provide a mitigation or modification of symptoms. However, the underlying physiological changes in the user, which lead to the reduction in the sense of hearing, are not taken into account. This limits a performance of this method as a matter of principle.

SUMMARY OF THE INVENTION

It is accordingly an object of the invention to provide a hearing device and a method which overcome the above-mentioned and other disadvantages of the heretofore-known devices and methods of this general type and which provide for a particularly suitable method for operating a hearing device and a particularly suitable hearing device, with a performance, in particular, being increased.

With the above and other objects in view there is provided, in accordance with the invention, a method for operating a hearing device which includes a microphone and a receiver connected to a signal processing unit. The method comprises:

providing an input signal;

selecting from the input signal a signal component having a specific frequency;

providing a further signal at a further specific frequency;

creating an output signal on a basis of the signal component and the further signal; and outputting the output signal by way of the receiver to generate a sound; and wherein the further signal is configured to form first time intervals and second time intervals, wherein hair cells of a region of a basilar membrane of a user of the hearing device that is associated with the specific frequency are excited on account of an interference during the first time intervals, while no excitation of the hair cells is effected during the second time intervals.

The method serves to operate a hearing device. By way of example, the hearing device is a pair of headphones or it comprises a pair of headphones, and the hearing device is a headset, for example. However, it is particularly preferred for the hearing device to be a hearing aid. The hearing aid serves to assist a person suffering from a reduced sense of hearing. In other words, the hearing aid is a medical device used for example to compensate for a partial loss of hearing. For instance, the hearing aid is a "receiver-in-the-canal" (RIC) hearing aid, an in-ear hearing aid such as an "in-the-ear" hearing aid, an "in-the-canal" (ITC) hearing aid or a "complete-in-canal" (CIC) hearing aid, a pair of hearing glasses or a pocket hearing aid. In an alternative to that, the hearing aid is a "behind-the-ear" (BTE) hearing aid worn behind an auricle.

The hearing device is provided and configured to be worn on the human body. In other words, the hearing device preferably comprises a holding apparatus which allows securing to the human body. Provided the hearing device is a hearing aid, the hearing device is provided and configured to be arranged behind the ear or within an auditory canal, for example. In particular, the hearing device is wireless and provided and configured for at least partial insertion into an auditory canal.

The hearing device comprises a microphone that serves to capture sound. In particular, ambient sound, i.e., sound waves, or at least a part thereof is captured by means of the microphone during operation. Advantageously, the microphone is at least partly arranged within a housing of the hearing device and thus afforded at least partial protection. The microphone suitably is an electromechanical acoustic transducer. For example, the microphone comprises only a single microphone unit or else a plurality of interacting microphone units. Each microphone unit advantageously comprises a membrane made to vibrate by sound waves, with the vibrations being converted into an electrical signal by means of an appropriate recording device, such as a magnet moved within a coil. In an alternative to that, the microphone units have a capacitive configuration, and use is made of the circumstances that an applied voltage changes if there is a change in the distance between the membrane and a static surface of the microphone unit. In the process, the voltage is applied in particular between the membrane and the static surface. The microphone units preferably have an omnidirectional configuration. In this or any other way, it is at least possible to generate or at least provide an input signal by means of the microphone, the input signal being based on the sound, specifically the ambient sound in particular, incident on the microphone.

Further, the hearing device comprises a receiver for outputting an output signal. In this case, the output signal is an electrical signal, in particular, and for example has a digital or suitable analog configuration. The receiver preferably is an electromechanical acoustic transducer, for example a loudspeaker. Depending on the configuration of the hearing device, the receiver in its intended state is arranged at least partially within an auditory canal of a user of the hearing device, i.e., a person also referred to as wearer, or the receiver is at least acoustically connected therewith. In particular, the hearing device serves predominantly to output the output signal by means of the receiver, with a corresponding sound being created. In other words, the main function of the hearing device preferably lies in the output of the output signal.

The hearing device also comprises a signal processing unit, by means of which the microphone and the receiver are signal connected. The hearing device expediently comprises a signal processor which for example forms the signal processing unit or at least is a constituent part thereof. For example, the signal processor is a digital signal processor (DSP) or realized by means of analog components. The input signal created by means of the microphone is adapted, in particular, by means of the signal processor or at least by means of the signal processing unit. At least the signal processing unit is suitable, in particular provided and configured, to this end. Expediently, an A/D converter is arranged between the microphone and the signal processing unit, for example the signal processor, if the signal processor is designed as a digital signal processor. Particularly preferably, the hearing device additionally comprises an amplifier, or the amplifier is formed at least in part by means of the signal processing unit. For example, the amplifier is disposed upstream or downstream of the signal processor from a signaling point of view.

The method provides for the provision of the input signal. To this end, the sound incident on the microphone in particular is captured, with the result that the input signal is provided. In other words, the input signal is provided by means of the microphone. By preference, the input signal is thus based on the incident sound. In an alternative to that, the hearing device for example comprises a communications apparatus, by means of which the input signal is received. For example, the latter was created by a separate device, such as a cell phone or the like, and transferred to the hearing device. In this case, the communications apparatus is operated according to a Bluetooth standard, for example. As an alternative to that or in combination therewith, the communications apparatus is suitable for receiving the input signal inductively.

A signal component is selected from the input signal in a further work step. In this case, the signal component has a specific frequency. For example, the signal component comprises only a single frequency or, particularly preferably, a plurality of frequencies such that the signal component includes a specific frequency band. This facilitates the processing thereof. The frequency bands are expediently prescribed, for example depending on the length of the (time) windows used for a frequency analysis. In particular, the frequency bands are specified by means of a filter bank. However, the frequencies are preferably arranged directly adjacently to one another in this case. In summary, the signal component is a constituent part of the input signal and has the specific frequency and a specific amplitude.

A further signal including a further specific frequency is provided in a further work step. Advantageously, the further signal includes a corresponding frequency band, i.e., a plurality of frequencies which are however directly adjacent to one another, as further specific frequency. In this case, the further signal is comparatively narrowband by preference. Further, the further signal has a further specific amplitude. The further specific frequency differs from the specific frequency. It is also true as a consequence that the further specific frequency is not a constituent part of the possible frequency band of the signal component if the frequency band is used as specific frequency.

An output signal is created on the basis of the signal component and the further signal in a further work step. Consequently, the output signal is based at least on the signal component and the further signal, with the result that if the signal component and/or further signal is modified, the output signal is also modified. In particular, the signal component and the further signal are combined for the purpose of creating the output signal. For example, the signal component and/or further signal is processed before these are combined to form the output signal. Particularly preferably, the output signal incorporates even further components, especially from the input signal, with the result that the output signal expediently comprises substantially all components of the input signal, with the individual components being processed in this case, in particular. To this end, the signal processor is expediently set on the basis of a parameter set. In this case, the parameter set specifies a gain in different frequency ranges, with the result that the input signal is processed in accordance with certain specifications, in particular depending on a loss of hearing of the hearing device wearer.

In a further work step, the output signal is output by means of the receiver such that a sound is created. In other words, sound waves are generated. In this case, the sound corresponds at least in part to the signal component and to the further signal. Consequently, the sound is also modified if the signal component is modified and/or the further signal is modified.

In the intended state, the hearing device is preferably at least partly situated within an auditory canal of the user, or at least the sound is introduced into the auditory canal of the user in the intended state/during the intended use. There, the sound is incident on a basilar membrane of the user, which serves for the capture of sound by the user. In summary, the hearing device thus is embodied such that, in particular, the sound is introduced into the auditory canal of the user in the intended state, and the sound is incident there on the basilar membrane. Hair cells are situated there, in particular the so-called outer hair cells which are made to vibrate on account of the sound. In this case, the basilar membrane has different regions assigned to different frequencies. In this case, when sound is incident, the hair cells assigned to the regions whose frequency corresponds to the sound, i.e., the sound waves, are predominantly made to vibrate. In other words, the hearing device is preferably embodied such that, in the intended state, the sound is introduced into the auditory canal of the user, wherefore the eardrum vibrates and, via coupling in the middle ear, the fluid in the cochlea is moved as well. The movements of the fluid in the cochlea generate a movement of the basilar membrane, to which both inner and outer hair cells are coupled. These hair cells are connected to the auditory system in the brain via nerve fibers and transform a mechanical movement into nerve impulses.

If the vibration has an amplitude above a hearing threshold assigned in each case, then there is a corresponding stimulation of the respectively assigned nerves, and so the user becomes aware of the sound at the corresponding frequency. In other words, to excite the hair cells, the latter are made to vibrate such that the associated nerves are stimulated. In summary, the basilar membrane allows a frequency-selective capture of the sound by the user.

In this case, the outer hair cells are not directly involved in guiding sound to the brain; instead, this falls to the inner hair cells. The outer hair cells are predominantly present to amplify (or even reduce where necessary) a movement of the basilar membrane. Small movements of the basilar membrane are amplified by the outer hair cells and strongly limited in terms of their local extent (and hence in their frequency), i.e., there is an amplified but very narrowband movement of the basilar membrane. This amplified movement is then registered by the inner hair cells and transmitted to the brain.

The number of hair cells is reduced in the case of a loss of hearing. Thus, the nerves are also stimulated to a reduced extent, and so there is in part no longer an excitation. It may be possible in this context that the outer hair cells are made to vibrate to a small extent, but this is insufficient to stimulate the assigned nerves. The hair cells also no longer influence one another on account of their reduced number, and so the hair cells of different regions are excited when sound is incident. As a consequence, frequency-selective hearing by the user is no longer fully possible.

In this case, the further signal is designed such that first time intervals and second time intervals arise if the hearing device is used as intended. In particular, the time intervals are formed such that these alternate here. In other words, each first time interval is followed by a respective second time interval, and vice versa. In this context, by preference, all first time intervals are of equal length, and/or all second time intervals are of equal length. For example, the length of the first time intervals here equals the length of the second time intervals, or the lengths of the time intervals differ from one another.

In this context, the hair cells assigned to the specific frequency are excited during the first time intervals on account of an interference. In particular, the interference here is between the portion of the sound based on the signal component and the portion of the sound based on the further signal. In particular, the two portions of the sound are superposed constructively in this region during the first time windows. Consequently, the hair cells experience increased excitation there, at least in comparison with the case in which the further signal is not a constituent part of the output signal.

By contrast, the excitation of the hair cells assigned to this region is suppressed during the first time intervals on account of the interference. In other words, the sound corresponding to the signal component is also introduced during the second time intervals, but the hair cells are not excited. In particular, the two portions of the sound are superposed destructively in this region during the second time windows.

In summary, the presence of the further signal leads to an increased excitation of the specific frequency-assigned hair cells during the first time intervals, and these hair cells are not excited during the second time intervals. Consequently, the hair cells are made to vibrate in the first time windows such that the amplitude of the vibration is greater than the respective hearing threshold. By contrast, the amplitude is lower than the assigned hearing threshold during the second time windows.

On account of the method there consequently was an alternating excitation of the assigned hair cells if the signal component is present, i.e., there was a corresponding stimulation of the associated nerves, and so the user can register a change in the excitation, facilitating the perception of the signal component or the sound based thereon. Comparatively comprehensive gain is not required in the process, and so there is a reduction in firstly the strain on the user and secondly a hearing device power consumption in comparison with other methods. Moreover, substantially only the hair cells assigned to the specific frequency are stimulated on account of the method, wherefore the user is able to make a comparatively accurate distinction between the sound based on the signal component and other sound constituent parts. In other words, the method allows the user to distinguish between individual frequencies, and so the user's spectral resolution is improved, and hence the user has improved understandability with regards to the sound.

The introduction of external further signals precisely to create the superposition can consequently lead to, in particular, less masking and hence an improved selectivity, precisely because the signal information is "cleaner" in various time intervals (and "blurrier" in others). Further, it may in particular be the case that the brain is thus able to use the moments of clarity to extract more information in the clean gaps.

Within the scope of the method, the user is not a constituent of the method but the provision of the further signal is advantageously adapted to the user. In summary, the further signal is adapted in particular on the basis of the user or at least a typical position of the hearing device vis-à-vis the basilar membrane, wherefore the position of the respective interferences, in particular the fully constructive/destructive interferences of the sound waves based on the signal component and the further signal, are always located in the desired region of the basilar membrane.

For instance, the method is performed in the time domain. It is particularly preferable however that a frequency analysis is performed at least in part for the purpose of performing the method, wherefore a Fourier transform, for instance, is used. Thus, the method is particularly preferably performed at least in part in the frequency domain. The signal processing unit expediently comprises a filter bank, by means of which the signal component is determined. In this case, the filter bank is designed as a linear or logarithmic filter bank, for example.

For instance, the signal component is always selected in the same manner. Hence, there substantially is no need for a comparatively comprehensive adaptation of the hearing device to different users. However, the signal component is particularly preferably selected depending on a loss of hearing of the user. In this context, the loss of hearing, by preference a reduction in the user's sensitivity in specific frequency ranges, is stored in the hearing aid in particular, expediently in the signal processing unit. In this context, the loss of hearing is determined for example in a separate method, for instance by an audiologist. On account of the adaptation on the basis of the loss of hearing, appropriate interferences are preferably implemented in a region of the basilar membrane in which the hair cells or the number thereof there are reduced. By contrast, the formation of corresponding interferences in regions still having a comparatively large number of hair cells is less pronounced. Consequently, information present and otherwise at least partly falsified is maintained in the input signal. Its understandability is thus increased.

Particularly preferably, the signal component is only selected if the amplitude of the signal component is greater than a specific threshold value. If the amplitude is lower than the threshold value, the signal component is present in the input signal only on account of background noise and/or noise in particular. Since the signal component is not selected in this case, the background noise is thus not present in the sound in amplified fashion, and so the background noise is substantially unperceivable by the user. This increases comfort.

For example, only a single signal component is selected. However, it is particularly preferable for a plurality of signal components to be selected, with the signal components each having different specific frequencies. In this case, the output signal is created on the basis of all selected signal components. In particular, a comparatively large distance is present here between the specific frequencies. Consequently, there is a correspondingly amplified excitation and omission of the excitation in different regions, and so the different frequencies are perceivable by the user. This further increases comfort. For example, the first and second time windows assigned to the different signal components are simultaneous, or these are time-offset from one another.

For example, the further signal is selected from the input signal and advantageously adapted appropriately. Consequently, the corresponding interferences are only implemented if the input signal already has the further signal. It is particularly preferable for the further signal to be generated synthetically, for example by means of a synthesizer, or the further signal is stored in a memory. Consequently, the corresponding interferences are implemented independently of whether the further signal is present in the input signal and independently of possible temporal modifications of the further signal in the input signal. Consequently, the interferences are always the same, increasing the user comfort.

In another implementation, the further signal is preferably selected from the input signal, and the phase is adapted purposefully. There is constructive or destructive interference in this case, depending on the phase. If this method includes the targeted phase manipulation of the individual signal components, then it is in particular also possible to select and manipulate the correct "further signal" in a more targeted manner, in order to generate the constructive/destructive intervals at the desired frequency.

Advantageously, the phase of the further signal is suitably adapted for the purpose of setting the desired interferences, independently of the manner in which the further signal is provided. As an alternative to that, or in combination, the amplitude is adapted accordingly. By preference, the amplitude and/or frequency of the further signal is adapted depending on a loss of hearing of the user and/or depending on the specific frequency, especially if a plurality of signal components with different specific frequencies are selected.

For example, only a single further signal is provided. This reduces the number of interferences and simplifies the determination of the individual interferences, and so performing the method has comparatively low requirements in respect of hardware resources. However, it is particularly preferable for a plurality of further signals to be provided. In this case, all further signals are used to create the output signal. This facilitates the formation of the interferences at the desired locations, i.e., having only an amplified excitation of the hair cells in the respective region or an omission of the hair cell excitation. Moreover, the plurality of further signals also make it possible to influence the length of the time windows, and so the hair cells can experience improved excitation in accordance with a respective specification. Consequently, the signal component, i.e. the sound based thereon, can be perceived in improved fashion by the user. By preference, a plurality of signal components are present here, with each of the signal components expediently being assigned at least one of the further signals.

For example, the amplitude of the signal component is not modified. However, the latter is additionally adapted by particular preference, preferably on the basis of the user's loss of hearing. In particular, the adapted signal component is added to the output signal, with the result that only the adapted signal component is present in the output signal. In other words, the output signal is created on the basis of the adapted signal component. Consequently it is possible to further amplify the formation of the interferences and thus increase a length of the first time windows during which there consequently is a comparatively strong excitation of the associated hair cells. Consequently, the user can perceive the signal component comparatively well. As an alternative to that, or in combination, the phase of the signal component is adapted accordingly. In particular, the signal component is adapted in frequency-dependent fashion here, preferably on the basis of the user. As a consequence, it is also possible to compensate other reasons for the loss of hearing using the method, and so a user comfort is further increased and a field of use of the hearing device is increased.

For example, the deviation of the specific frequencies from the further specific frequency is constant, i.e., static. In other words, the further specific frequency is also specified if the specific frequency is specified, in particular on account of the loss of hearing. It is consequently easier to determine the arising interferences. In an alternative to that, the deviation between the specific frequency and the further specific frequency is adapted on the basis of a parameter. In other words, the deviation is not static, and it is for example possible that the further specific frequency is higher or lower than the specific frequency depending on the parameter. Thus, in particular, a length of the first/second time windows is also modified on the basis of the parameter. For example, the presence of background noise and/or an operating mode of the hearing device is used as a parameter.

For example, the further signal is always provided. Thus, the behavior of the hearing device for the user is always predictable. However, the further signal is not provided by particular preference if the signal component is classified as belonging to a background noise. In other words, the input signal is initially classified, with a check being carried out as to whether the signal component is caused on account of the background noise. The further signal is not generated in this case, wherefore the background noise is not perceivable by the user or only perceivable by the user to a reduced extent. Hence, comfort is increased for the user. By contrast, the further signal is provided if the signal component is classified as not belonging to the background noise and in particular classified as a useful noise or a portion of the useful noise. Consequently, the useful noise is better perceivable by the user.

For example, the hearing device is a headset or, by particular preference, a hearing aid. For example, the hearing aid is a "receiver-in-the-canal" (RIC) hearing aid, an in-ear hearing aid such as an "in-the-ear" hearing aid, an "in-the-canal" (ITC) hearing aid or a "complete-in-canal" (CIC) hearing aid, a pair of hearing glasses or a pocket hearing aid. In an alternative to that, the hearing aid is a "behind-the-ear" (BTE) hearing aid worn behind an auricle.

The hearing device comprises a microphone and a receiver that are signal connected by means of a signal processing unit. The hearing device is operated in accordance with the method in which an input signal is provided, preferably by means of the microphone. A signal component including a specific frequency is selected from the input signal, and a further signal with a further specific frequency is provided. An output signal is created on the basis of the signal component and the further signal, and the output signal is output by means of the receiver such that a sound is created. In this case, the further signal is designed, and for example appropriately created/adapted, such that first time intervals and second time intervals arise. During the first time intervals, hair cells associated with a specific frequency-assigned region of a basilar membrane of a user are excited on account of an interference. There is no excitation of the hair cells during the second time intervals. For example, the method is at least partially performed by means of the signal processing unit. Consequently, the signal processing unit is suitable, in particular provided and configured, to perform the method at least in part.

The developments and advantages explained in the context of the method are also applicable mutatis mutandis to the hearing device, and vice versa. Other features which are considered as characteristic for the invention are set forth in the appended claims.

Although the invention is illustrated and described herein as embodied in a method for operating a hearing device, and hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts corresponding to one another are provided with the same reference signs throughout the figures.

DETAILED DESCRIPTION OF THE INVENTION

Figure 1:
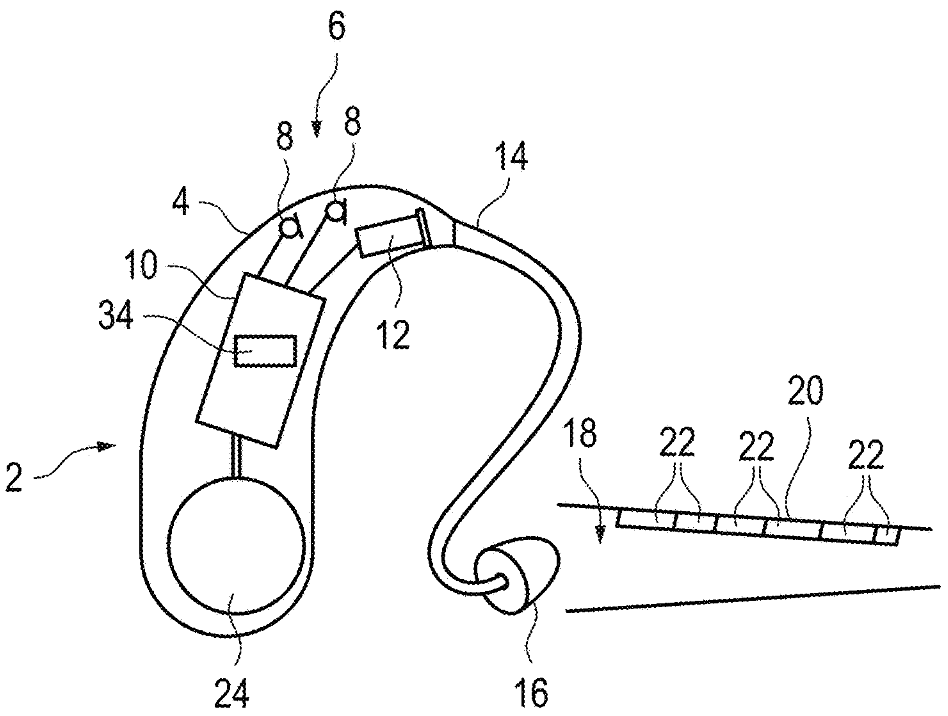
FIG. 1 is a schematic view of a hearing device.

Referring now to the figures of the drawing in detail and first, in particular, to FIG. 1 thereof, there is shown a schematic view of a hearing device 2 in the form of a hearing aid which is provided and configured to be worn behind an ear of a wearer (user, hearing device wearer). In other words, this is a "behind-the-ear" BTE hearing aid. The hearing device 2 comprises a housing 4 made of plastic. A microphone 6 with two microphone units 8 in the form of an electromechanical acoustic transducer with an omnidirectional configuration in each case is arranged within the housing 4. By virtue of a time offset between the acoustic signals captured by means of the omnidirectional microphone units 8 being modified, it is possible to change a directional characteristic of the microphone 6 such that a directional microphone is realized.

The two microphone units 8, i.e., the microphone 6, are signal coupled to a signal processing unit 10 which comprises an amplifier circuit and a signal processor. Further, the signal processing unit 10 is formed by means of circuit elements, for example electrical and/or electronic components. The signal processor is a digital signal processor (DSP) and signal-connected to the microphone units 8 via an A/D converter.

A receiver 12 is signal-coupled to the signal processing unit 10. Consequently, the microphone 6 and the receiver 12 are signal-connected by means of the signal processing unit 10. The receiver 12, which is an electromechanical acoustic transducer, is used, during operation, to convert an (electrical) signal provided by means of the signal processing unit 10 into sound waves. These are introduced into a sound tube 14, the one end of which is fastened to the housing 4. The other end of the sound tube 14 is enclosed by means of a dome 16 which, in the intended state, is arranged in an auditory canal 18 of a user of the hearing device 2, i.e., the wearer of the hearing device 2.

The basilar membrane 20 which has a plurality of regions 22 is situated in the auditory canal 18 of the user. Each of these regions 22 are associated with hair cells (not depicted in detail), so-called outer hair cells. When sound waves enter the auditory canal 18, they make the hair cells vibrate, with a maximum amplitude of the vibration forming in the region 22 that is assigned to the frequency of the sound waves. In this case, the amplitude of the forming vibration also depends on the amplitude of the sound wave. If the sound waves have only a single frequency, then the maximum forms in only one of the regions 22. By contrast, if the sound wave has another frequency, the maximum forms in another one of the regions 22. If the amplitude is greater than a respectively assigned hearing threshold, the nerves associated with the respective region 22 are stimulated, with the result that the user perceives the sound wave. Otherwise the sound wave is not perceived.

If a few of the hair cells are lost, the height of the achievable vibration amplitude maximum is reduced, and so the corresponding nerve cells are only stimulated in the case of a comparatively large amplitude of the respective sound wave. Additionally, an interaction between the hair cells is modified on account of the smaller number, and so the maximum forms not only in the region assigned to the respective frequency but also in surrounding regions 22. Therefore, the user does not perceive only a single sharp frequency, reducing understandability. For example, this happens if the sound is below a hearing threshold, but also at levels above the hearing threshold. Since the outer hair cells contribute to ensuring a good frequency selectivity, it is the loss thereof that leads to a broader excitation of the basilar membrane 20. A loss of hearing most frequently relates to the outer hair cells. Since the outer hair cells have an active gain mechanism, this results in a nonlinear behavior of the basilar membrane excitation. When the inner hair cells are still present, the processing in the inner ear is more linear in these regions.

Figure 2:
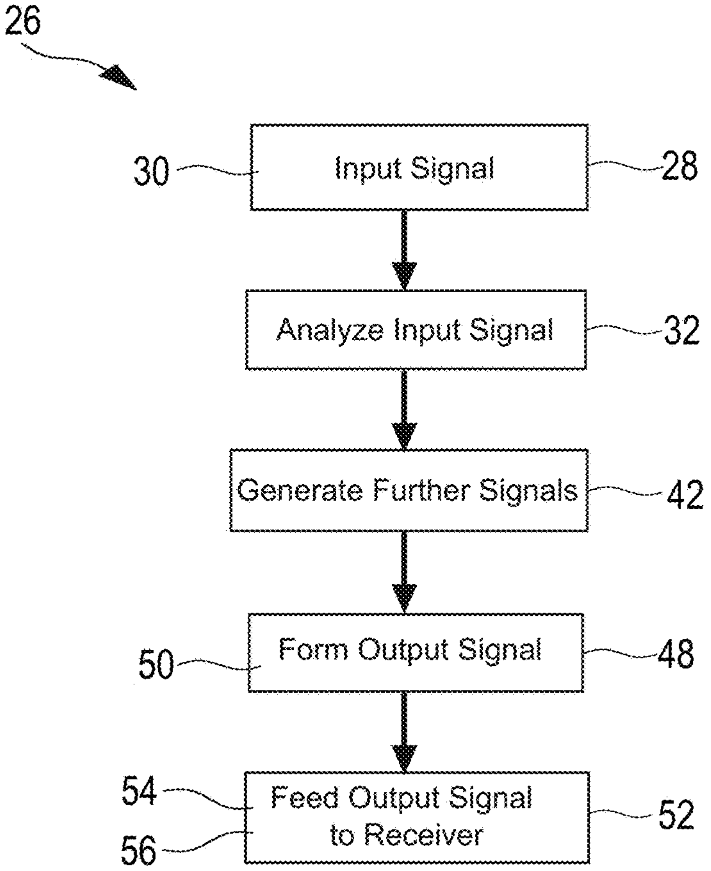
FIG. 2 shows a flowchart illustrating a method for operating the hearing device.

The signal processing unit 10 is energized by means of a battery 24 arranged in the housing 4. Some of the electrical energy is guided from the signal processing unit 10 to the microphone 6 and the receiver 12. In the process, a method 26 for operating the hearing device 2, as depicted in FIG. 2, is performed at least in part by the signal processing unit 10. In other words, the hearing device 2 is operated in accordance with the method 26. An input signal 30 is provided in a first work step 28. In this case, the input signal 30 is generated by the microphone 6, for example, and guided to the signal processing unit 10 such that said signal is received by means of the signal processing unit 10.

In a subsequent second work step 32, the input signal 30 is analyzed in terms of frequency, wherefore use is made of a filter bank 34 of the signal processor in the signal processing unit 10. In this case, the individual frequencies of the input signal 30 and the associated amplitudes are determined, with the result that a frequency spectrum is created. Further, the individual components of the frequency spectrum are classified.

Figure 3:
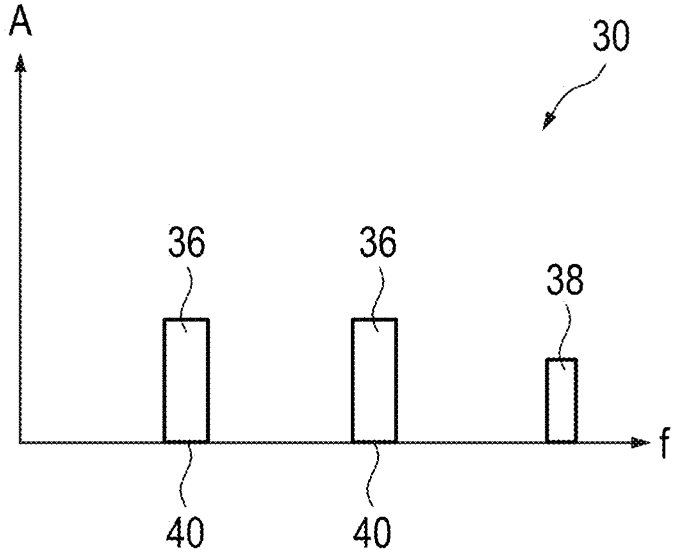
FIG. 3 shows a simplified frequency spectrum of an input signal used in the method.

FIG. 3 depicts an example of a corresponding frequency spectrum of the input signal 30. This has two signal components 36, which are present on account of a useful noise, i.e., for example, on account of speech in the sound captured by means of the microphone 6. Further, the input signal 30 has a residual component 38, which in the depicted example is likewise due to speech present in the sound captured by means of the microphone 6.

Each of the two signal components 36 has a specific frequency 40, specifically a frequency band, with the two specific frequencies 40 assigned to the different signal components 36 differing. The user has a reduction in the hair cells, and this causes a loss of hearing for the user, in the regions 22 of the basilar membrane 20 assigned to these two specific frequencies 40. In this case, the reduction is greater in one of the two regions 22 than in the other one of the two regions 22. By contrast, the frequency of the residual component 38 corresponds to one of the regions 22 of the basilar membrane 20 where there is no, or only a small, reduction in the hair cells. Consequently, a sense of hearing of the user is not restricted at this frequency.

The two signal components 36 are selected. In other words, the signal components 36 are selected on the basis of the user's loss of hearing, whereas the residual component 38 is not selected since there is no loss of hearing at the associated frequency. In summary, a plurality of signal components 36, specifically two signal components, are thus selected, which each have the respective specific frequency 40 and each are a constituent of the input signal 30.

In a third work step 42, two respective further signals 44 are generated synthetically for each of the selected signal components 36 and are consequently provided. Each of the further signals 44 has a further specific frequency 46. In summary, a plurality of further signals 44, specifically four further signals, are provided, with two of these being respectively assigned to one of the two signal components 36. In this case, the further specific frequencies 46 of the respective further signals 44 differ from the specific frequency 40 of the respectively assigned signal component 36, with the deviation between the specific frequency 40 and the two further specific frequencies 46 being adapted on the basis of a parameter. In the depicted example, the number of residual components 38 is used as parameter, or for example an ambient volume and/or the presence of a background noise. It is also possible to determine the respective deviation on the basis of the user's loss of hearing.

In the depicted example, the further specific frequencies 46 directly adjoin the specific frequency 40 of the one assigned signal component 36, and so the frequency band of the signal component 36 is framed by the frequency bands of the assigned further signals 44, and these directly adjoin one another. Consequently, one of the further specific frequencies 46 is higher, and the other further specific frequency 46 is lower, than the associated specific frequency 40.

In the other signal component 36, the frequency band of one of the further signals 44 is directly adjacent. By contrast, the frequency band of the other further signal 44 is slightly spaced apart from the frequency band of the assigned signal component 36.

In the third work step 42, the amplitudes of the two signal components 36 are moreover adapted on the basis of the user's loss of hearing. In the example illustrated, the amplitudes of the signal components 36 of the input signal 30 were essentially of equal size. On account of the adaptation on the basis of the user's loss of hearing, the amplitude of one of the two signal components 36 is greater following the adaptation in the example illustrated; however, both amplitudes were increased.

Figure 4:
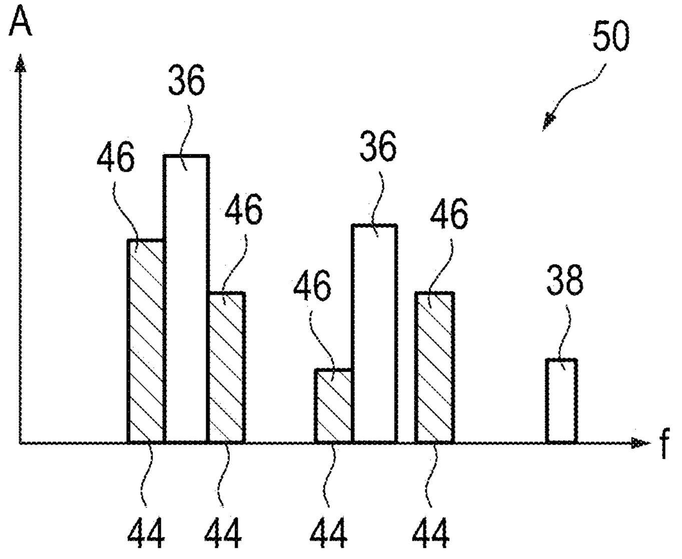
FIG. 4 shows a simplified frequency spectrum of an output signal created by means of the method.

The adapted signal components 36, the further signals 44 and the residual component 38 are combined to form an output signal 50 in a directly subsequent fourth work step 48, with the result that the output signal 50 is created on the basis of the adapted signal components 36 and the further signals 44. Consequently, the output signal 50 has the frequency spectrum depicted in FIG. 4.

The output signal 50 is guided to the receiver 12 in a directly subsequent fifth work step 52; the receiver is used to output sound, which was introduced into the auditory canal 18 on account of the arrangement of the hearing device 2 during intended use, into the auditory canal. Consequently, the output signal 50 is output by means of the receiver 12 such that the sound is created. In particular, the output signal 50 is initially converted into an analog signal such that the analog output signal 50 is output. In this case, the sound is composed of different sound waves and corresponds to the (adapted) signal component 36 and the further signals 44. In a variant (not depicted in detail), the output signal 50 is moreover amplified by means of an amplifier.

The sound is incident on the basilar membrane 20 of the user, and so the regions 22 are excited. In this case, the further signals 44 were created in such a way that first time intervals 54 and second time intervals 56 are formed. To this end, the further specific frequencies 46, the phases and the amplitudes of the further signals 44 were chosen accordingly. The first time intervals 54 alternate with the second time intervals 56. The hair cells in the regions 22 associated with the specific frequencies 40 of the signal components 36 are excited during the first time intervals 54 on account of an interference of the sound waves corresponding to the signal components 36 with the sound waves corresponding to the further signals 44. By contrast, there is no excitation during the second time intervals 56 of the hair cells associated with the same region 22.

Figure 5:
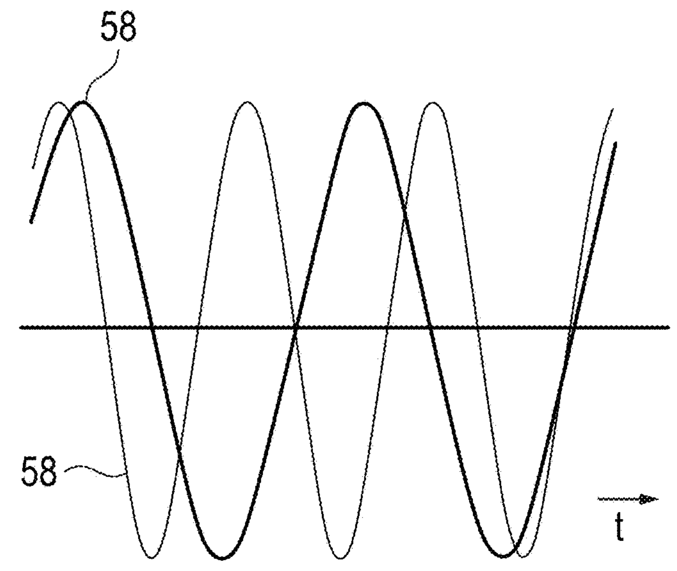
FIG. 5 is an illustration of a sound wave created on the basis of a signal component and a sound wave created on the basis of a further signal and FIG. 6 shows the superposition of the two soundwaves.

To explain the principle, FIG. 5 depicts two sound waves 58 which have deviating frequencies. For a simplified representation, the amplitudes of the two sound waves 58 have been chosen to be the same.

Figure 6:
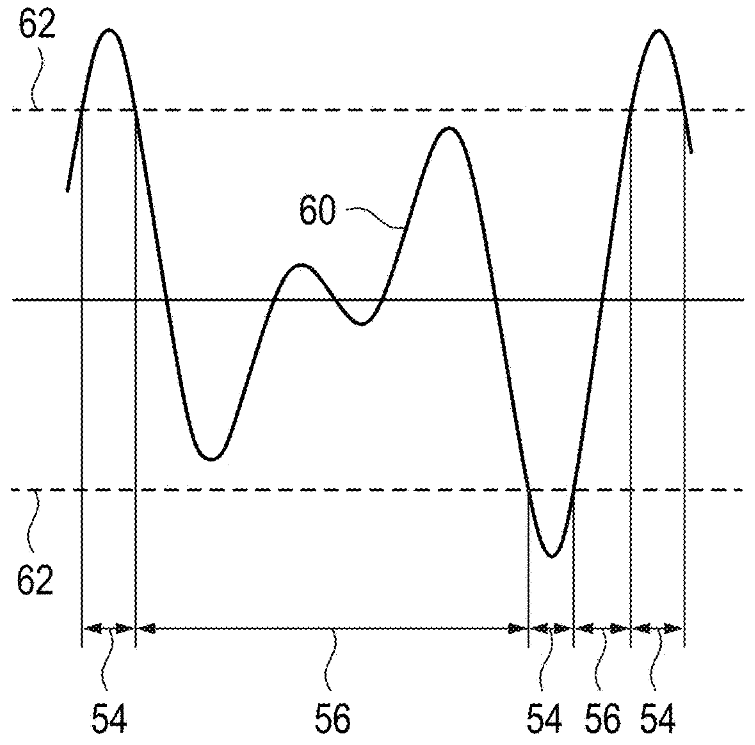

The superposition of the two sound waves 58, i.e., the resultant sound 60, is depicted in FIG. 6. The first time intervals 54 during which the absolute value of the resultant sound 60 is greater than a hearing threshold 62 arise on account of the interference. In this case, the hair cell vibration is large enough to stimulate the associated nerves. In other words, the hair cells are excited. By contrast, if the resultant sound 60 is less than the hearing threshold 62, then there is no excitation and one of the second time intervals 56 is formed. On account of the alternating excitation of the associated hair cells, the sound is perceivable comparatively accurately by the user.

In this case, the further signals 44 are designed such that the hair cells of the region 22 assigned to the respective assigned specific frequency 40 are excited, but neighboring regions 22 are not. Consequently, the specific frequencies 40, and hence the signal components 36, are perceivable comparatively accurately by the user and assignable to the specific frequency 40. Consequently, a spectral resolution during hearing is increased for the user despite the loss of hair cells.

The signal components 36 are selected on the basis of the user's loss of hearing. In other words, the specific frequencies 40 are assigned to those regions 22 at which a loss of hair cells is present. However, if the respective signal component 36 is classified as belonging to a background noise in the second work step 32, then the assigned further signals 44 are not generated. Consequently, the background noise is not perceivable by the user in amplified fashion either, and this is why comfort is increased.

The invention is not restricted to the above-described exemplary embodiment. On the contrary, other variants of the invention may also be derived herefrom by a person skilled in the art, without departing from the subject matter of the invention. In particular, all the individual features described in connection with the exemplary embodiment can furthermore also be combined with one another in other ways, without departing from the subject matter of the invention.

The following is a summary list of reference numerals and the corresponding structure used in the above description of the invention:

2 Hearing device
4 Housing
6 Microphone
8 Microphone unit
10 Signal processing unit
12 Receiver
14 Sound tube
16 Dome
18 Auditory canal
20 Basilar membrane
22 Region
24 Battery
26 Method
28 First work step
30 Input signal
32 Second work step
34 Filter bank
36 Signal component
38 Residual component
40 Specific frequency
42 Third work step
44 Further signal
46 Further specific frequency
48 Fourth work step
50 Output signal
52 Fifth work step
54 First time interval
56 Second time interval
58 Sound waves
60 Resultant sound
62 Hearing threshold

The invention claimed is:

1. A method for operating a hearing device which includes a signal processing unit and a microphone and a receiver connected to the signal processing unit, the method comprising:

providing an input signal;

selecting from the input signal a signal component having a specific frequency;

providing a further signal at a further specific frequency;

creating an output signal on a basis of the signal component and the further signal; and outputting the output signal by way of the receiver to generate a sound; and wherein the further signal is configured to form first time intervals and second time intervals, wherein hair cells of a region of a basilar membrane of a user of the hearing device that is associated with the specific frequency are excited on account of an interference during the first time intervals, while no excitation of the hair cells is effected during the second time intervals.

2. The method according to claim 1, which comprises selecting the signal component depending on a loss of hearing of the user.

3. The method according to claim 1, which comprises selecting a plurality of signal components.

4. The method according to claim 1, which comprises generating the further signal synthetically.

5. The method according to claim 1, which comprises providing a plurality of further signals.

6. The method according to claim 1, which comprises adapting an amplitude of the signal component depending on a loss of hearing of the user.

7. The method according to claim 1, which comprises adapting a deviation between the specific frequency and the further specific frequency on the basis of a parameter.

8. The method according to claim 1, which comprises not providing the further signal when the signal component is classified as belonging to a background noise.

9. A hearing device, comprising a microphone and a receiver connected, for signal transmission, with a signal processing unit and configured for operation by a method according to claim 1.

* * * * *